3,657,179
FLAME RETARDANT ANTIMONY COMPOSITIONS

Paul C. Yates, Wilmington, Del., assignor to E. I. du Pont de Nemours and Company, Wilmington, Del.
No Drawing. Filed Nov. 30, 1970, Ser. No. 93,863
Int. Cl. C08k 1/34
U.S. Cl. 260—30.8 DS
21 Claims

ABSTRACT OF THE DISCLOSURE

Solutions of pentavalent antimony-alpha-hydroxy carboxylic acid compounds or of hydrous pentavalent antimony sols stabilized with an alpha-hydroxy carboxylic acid in polar organic solvents suitable for spinning or casting organic polymers are useful for dispersing flame-retarding pentavalent antimony compounds in polymeric structures.

BACKGROUND OF THE INVENTION

Compounds of alpha-hydroxy carboxylic acids and antimony are well known. For example, tartar emetic, the potassium salt of trivalent antimony tartrate, has had known medical uses for many years. Other medicinal uses of trivalent antimony complexes are described in "Organic Derivatives of Antimony" by W. G. Christianson, Chemical Catalog Co. Inc., New York, N.Y., 1952. Tartaric acid has also been employed to prevent precipitation of pentavalent antimony compounds in analytical chemistry procedures in aqueous systems.

British Pat. 779,288 claims flameproofing compositions for polymers such as polyesters, polystyrenes etc. consisting of tartar emetic or related antimonyl salts such as ammonium, barium etc., and a chlorinated paraffin wax. The procedure in the patent involves dry mixing the flameproofing composition and polymer resin, then curing the mixture at elevated temperatures. There is no disclosure of combining the flameproofing composition with a polymeric spinning or casting solution in which the solvent is typically a polar organic solvent such as dimethylformamide. In fact, tartar emetic is not soluble in polar organic solvents.

Most published literature on antimony-tartaric acid compounds relates to aqueous systems.

There is a need for a flameproofing composition which can be mixed with organic polymers dissolved in polar organic solvents prior to spinning fibers or casting films or foams which will impart permanent flame-resistance and will not adversely affect the appearance or physical properties of the material.

It is an object of this invention to provide stable pentavalent antimony-alpha hydroxy carboxylic acid compounds and sols of hydrous antimony pentoxide stabilized with alpha-hydroxy carboxylic acids dissolved in polar organic solvents which can be combined with spinning or casting solutions of polymers to impart flame-resistance to the spun or cast polymeric article.

SUMMARY OF THE INVENTION

Antimony compounds such as esters and zinc and stannous salts of the same esters of the formula

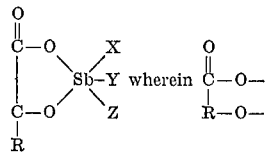

is a divalent alpha-hydroxy carboxylic acid radical of from 2 to 6 carbon atoms and X, Y and Z independently are anions such as hydroxide, formate, acetate, alkoxide of 1 to 4 carbon atoms, bromide, chloride or nitrate or X and Y together are

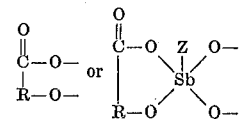

are readily soluble in polar organic solvents such as formamide, monoethylformamide, dimethylformamide, acetamide, methylacetamide, dimethylacetamide, dimethylsulfoxide, ethylene glycol, glycerol, formic acid, tetramethylurea, methanol and ethanol. Dispersions of colloidal hydrous antimony pentoxide having a particle diameter of up to 100 angstrom units, stabilized by alpha-hydroxy carboxylic acids of 2 to 6 carbon atoms, and having a ratio of alpha-hydroxy carboxylic acid to antimony of from 0.1:1 to less than 1:1 are also easily formed in the polar solvents listed above except the polyhydroxy solvents, ethylene glycol and glycerol.

These sols and solutions may be combined with spinning or casting solutions of organic polymers in polar organic solvents. The spun or cast polymeric article will contain the dispersed antimony compound or sol and will be highly resistant to combustion.

DESCRIPTION OF THE PREFERRED EMBODIMENTS

Solvents of the invention

Solvents suitable for the solutions and sols of this invention generally combine high dielectric constants, in excess of 15 electrostatic units measured at 25° C. and at from $10^4$ to $10^5$ cycles per second, with a relatively high mole ratio of polar atoms such as oxygen, nitrogen or sulfur to carbon atoms.

Suitable solvents include formamide, monomethylformamide, dimethylformamide, acetamide, methylacetamide, dimethylacetamide, dimethylsulfoxide, ethylene glycol, glycerol, formic acid, tetramethylurea, methanol, ethanol, and the like. The dispersions of the invention may contain from 0.01 to 5% water, but it is preferred that the water content be less than 2% and substantially anhydrous dispersions are most preferred. It must be noted that the polyhydroxy solvents, glycerol and ethylene glycol will react with hydrous antimony pentoxide and thus the colloidal sols of this invention cannot be formed with these solvents. The most preferred solvents are dimethylformamide, dimethylsulfoxide, formamide and anhydrous formic acid.

Alpha-hydroxy carboxylic acids of the invention

Alpha-hydroxy carboxylic acids useful in this invention are those aliphatic carboxylic acids of two to six carbon atoms having a hydroxyl group attached to the carbon chain at the position alpha to the carbonyl group. As used herein, the term alpha-hydroxy carboxylic acid is meant to include oxalic acid in which the hydroxyl group is part of the second carboxyl group of the 2 carbon dicarboxylic acid.

The compound may contain more than one carboxyl group as in the case of oxalic acid and may also contain more than one alpha-hydroxy carboxylic acid grouping, for example, tartaric or citric acid. Suitable alpha-hydroxy carboxylic acids of the invention thus include oxalic acid, tartaric acid, malic acid, hydroxyacetic acid, citric acid, mucic acid, lactic acid, glyceric acid, gluconic acid, and the like.

Pentavalent antimony compounds of the invention

The compounds of this invention are made by the addition of an alpha-hydroxy carboxylic acid such as malic acid to a dispersion or gel of antimony pentahydroxide in a polar organic solvent such as dimethylformamide or dimethylsulfoxide. The ratio of acid to antimony must be at least 1:1 to form the compounds of this invention. The ratio may be as high as 2:1. At ratios higher than 2:1 not all of the acid can react. Excess free acid can be present in the solutions of this invention although this generally offers no advantages. Aliphatic carboxylic acids which do not have alpha-hydroxyl groups, such as succinic acid, do not form soluble compounds when added to dispersions or gels of pentavalent antimony hydroxide.

The infrared spectrum of a solution of the malic acid-pentavalent antimony compound in dimethylsulfoxide shows a split in the carbonyl band at 5.82 and 5.87 microns, indicating that one carboxylic group is free and the other is bonded to the antimony. The NMR spectrum of a solution in deuterated dimethylsulfoxide measured at 60M c.p.s. shows a multiplet at 4.50 delta where delta is defined by the equation $$\delta \text{ (p.p.m.)} = \frac{\Delta \times 10^6}{\text{operating frequency (c./s.)}}$$

where $\Delta$ is the distance of the absorption peak from that of trimethyl silane in cycles per second (c./s.), as compared to 4.35 delta for a solution of pure malic acid, indicating that the alpha-hydroxy groups are also involved in the bonding. The NMR and infrared spectra are consistent with the following structure.

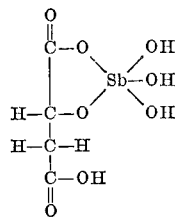

(I)

This layer chromatography indicates that the compound is either monomeric or dimeric. The compounds of the structure of Formula I probably dimerize to form either of the following structures, releasing water.

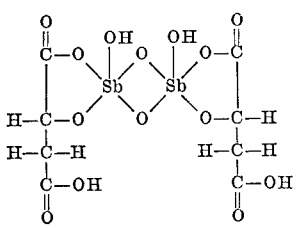

(II)

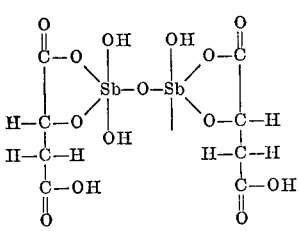

(III)

The above structures illustrate compounds formed with an acid to antimony ratio of 1:1. It is possible, however, to form compounds with an acid to antimony ratio of 2:1 and the IR and NMR spectra of solutions of such compounds are in agreement with the following structure:

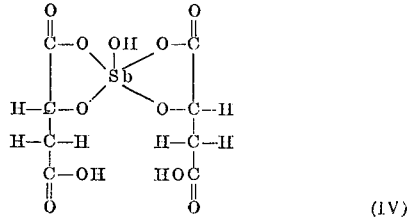

(IV)

The essential requirement for the formation of compounds of pentavalent antimony and aliphatic hydroxy carboxylic acids, soluble in polar organic solvents, is the presence of a hydroxy group on the carbon atom alpha to a carboxylic group. Additional hydroxyl groups, although they may contribute to further bonding of the antimony, still give rise to stable compounds. Hydroxy groups which do not form bonds with the pentavalent antimony are important only insofar as they affect the solubility of the compounds in the polar organic solvents of the invention.

When the ratio of acid to antimony is between 1:1 and 2:1 a mixture of the 1:1 and 2:1 compounds is present.

Colloidal sols of the invention

When the ratio of alpha-hydroxy carboxylic acid to antimony is less than 1:1, the colloidal sols of this invention are formed. However, below an acid to antimony ratio of 0.1:1, the sols are not sufficient stable for many purposes and tend to grow in particle size, gel and undergo phase separation from the solvent dispersions or solutions of the invention. The most preferred range is from 0.25 to less than 1 mole of alpha-hydroxy carboxylic acid per mole of pentavalent antimony.

The compositions of the invention are transparent, colorless sols or solutions which do not flocculate or gel over a period of several months at room temperature. At the lowest ratios of alpha-hydroxy carboxylic acids to pentavalent antimony, a slight opalescence occasioned by the presence of a portion of the antimony compound in the form of a colloidally subdivided material can be noted. Electron micrographs of such solutions show colloidal particles of very small diameter in the range of 50 to 100 angstrom units. It is believed that such compositions comprise colloidal particles consisting of pentavalent antimony atoms linked by oxygen atoms and maintained in a fine state of subdivision and in a stable condition toward particle growth or gelation by alpha-hydroxy carboxylic acid. It is not certain whether the acid is hydrogen bonded to the hydrous antimony pentoxide particle or is in the form of an acid-antimony compound cross-linked to the hydrous antimony pentoxide. If an otherwise identical antimony preparation is made which does not contain the stabilizing alpha-hydroxy carboxylic acids of the invention, relatively rapid particle growth, within a matter of a few moments to at most a few hours, will be observed and opaque large particle size gels and flocculated precipitates will be obtained.

The compositions of this invention may comprise mixtures of the colloidal sols and the solutions of pentavalent antimony-alpha-hydroxy carboxylic acids.

Metal salts of the antimony compositions of the invention

Surprisingly, it has been noted that certain divalent metal ions such as zinc and stannous tin may form salts of the alpha-hydroxy carboxylic acid pentavalent antimony compounds of the invention. Such salts, for example, in up to a 1:1 mole ratio of zinc with antimony, are particularly easily formed when the ratio of alpha-hydroxy carboxylic acid to antimony is relatively high. Thus, if one or two alpha-hydroxy carboxylic acid functional groups are provided per mole of antimony, it is possible to introduce as much as a mole of zinc per mole of antimony in the form of the zinc salt of the antimony compound with the alpha-hydroxy carboxylic acid. When less alpha-hydroxy carboxylic acid is employed, the amount of zinc or stannous salt should be decreased proportionately.

While the mechanism of formation and the exact structure of these salts are not precisely known, they are not simply salts between zinc and the complexing alpha-hydroxy carboxylic acid, since it has been observed that substances which normally precipitate simple salts of zinc such as oxalic acid do not do so in these compounds. The zinc salts of the antimony compounds of the invention are preferred species of the invention because of their high efficiency as flame retardants for organic polymers, films, foams and fibers.

Other stabilizing anions and radicals

In addition to the hydroxide ion and alpha-hydroxy carboxylic acids, other anions and radicals such as chloride, bromide, nitrate, formate, acetate and alkoxide of 1 to 4 carbon atoms may also be present, but it is generally preferred to avoid high concentrations of them. Mole ratios of these anions to antimony below 1.5 and preferably below 0.5 may be used.

To some degree, these stabilizing anions and radicals assist in maintaining the compositions of the invention in the form of clear solutions or dispersions, thus minimizing particle growth, coagulation, and gelation of the compositions. The preferred concentrations of such anions and radicals therefore have an inverse relationship to the ratio of the alpha-hydroxy carboxylic acids to pentavalent antimony in the compounds of the invention. In those instances where lower ratios of acids are used, as for example a tenth of a mole of an acid such as tartaric acid per mole of antimony, it is desirable to have somewhat higher concentrations of chlorides, nitrates, formates or alkoxide radicals such as ethoxide to satisfy the remaining valences of the pentavalent antimony compound. It is never necessary, however, and it is not preferred, that the concentration of such additional radicals or anions be equal to the total number of remaining valences of the pentavalent antimony not satisfied by the alpha-hydroxy carboxylic acid. In general, even at the lowest ratio of alpha-hydroxy carboxylic acid, such as the case where there are 10 atoms of pentavalent antimony per molecule of acid, it is unnecessary to have more than 15 of the remaining 48 valences of the pentavalent antimony satisfied by such anions or radicals. It is believed that the remaining valences of the pentavalent antimony are occupied either by hydroxyl groups or by polymeric linkages through shared oxygen atoms to other antimony atoms.

Concentrations of the compositions of the invention

The concentration of the compositions of the invention can be varied over relatively wide ranges, since these antimony compounds show substantial solubility in polar solvents of the types previously discussed. Ordinarily speaking, the antimony content will be in the range of from 1 to 30% by weight, but for most uses, compositions containing more than 5% and preferably more than 10% antimony are desirable. Naturally, there will be some variability in the solubility of the compounds of the invention in different solvent systems, but the solubility in all solvents of the type previously discussed is sufficient to enable the antimony compounds of the invention to be conveniently introduced into organic polymers which can be simultaneously dissolved in the solvents.

Processes of the invention

In general, the compositions of the invention may be prepared by first preparing a high surface area, chemically reactive form of hydrous antimony pentoxide or antimony pentahydroxide by some suitable means, suspended in one of the solvents of the invention, and adding to this the desired amount of one of the alpha-hydroxy carboxylic acids of the invention. If the technique for preparing the pentavalent antimony hydrous oxide or pentahydroxide has been properly carried out, the reaction will proceed with rapidity even at room temperature, and formation of the compounds of the invention is substantially immediate.

Several possible procedures for preparing the antimony pentahydroxide exist. In a preferred procedure, a salt of trivalent antimony is oxidized to the pentavalent form while simultaneously removing a substantial portion of the anion of the antimony salt. For example, antimony trichloride may be dissolved in concentrated nitric acid at a temperature below 100° C. It is necessary in oxidizing the trivalent antimony species that this oxidation be done at as low a temperature as is consistent with a reasonable rate of reaction. Temperatures in excess of 100° C. are not preferred, since this leads to particle growth and dehydration of the resulting pentavalent antimony hydroxide which then does not react satisfactorily with the alpha-hydroxy carboxylic acid to form the compounds of the invention. A temperature in the range of from 60 to 80° C. is preferred for the oxidation, as well as subsequent steps, since within this temperature range, the oxidation proceeds rapidly, but a highly reactive form of hydrous antimony pentoxide or antimony pentahydroxide is obtained. The exact reaction which takes place is probably complex, but reaction I illustrated below is thought to be the primary one.

(I) $SbCl_3 + 2HNO_3 + 3H_2O \rightarrow Sb(OH)_5 + N_2O_4 + 3HCl$

There are indications of contributions from a second reaction, which can be written as:

(II) $2SbCl_3 + 10HNO_3 \rightarrow 2Sb(OH)_5 + 5N_2O_4 + 3Cl_2$

The first reaction requires two moles of nitric acid per mole of antimony, while the second requires five moles of nitric acid per mole of antimony chloride. Thus, to take care of the possibility of this reaction participating to some extent, an excess of nitric acid is used. The excess can be destroyed by reducing with a suitable reducing agent such as formaldehyde, according to Equation III given below:

(III) $4HNO_3 + CH_2O \rightarrow CO_2 + 3H_2O + 2N_2O_4$

It can be seen that the net result of either of the first two reactions followed by the reduction of excess nitric acid with formaldehyde as in the third reaction, is to give a substantially anion-free active antimony pentahydroxide. So long as such a pentahydroxide has not been heated above 100° C. and preferably not above 80° C., it reacts rapidly with the alpha hydroxy carboxylic acids of the invention to form stable antimony compounds.

Other routes are, of course, possible for preparing the compounds of the invention. One may, for example, oxidize solid antimony trioxide with aqueous nitric acid containing hydrochloric acid as a catalyst, and if this is done at low temperature, a suitable active antimony pentavalent hydroxide or hydrous oxide will be obtained.

Active antimony pentahydroxide can also be prepared from antimony pentachloride by reacting with water containing ammonia or other bases to precipitate the pentahydroxide and washing to remove the salt by-products.

In a third procedure, easily hydrolyzed esters of pentavalent antimony such as antimony pentamethoxide or antimony pentaethoxide may be employed as starting materials, and these may then be hydrolyzed to an active form of the pentahydroxide. The procedure for preparation of antimony pentaethoxide is described in the Bulletin of the Chemical Society of France, vol. 10, pp. 2962–2965 (1965) and in Chemical Abstracts 64 1598b. So long as these various reactions are performed at sufficiently low temperature to give a high surface area, highly reactive pentahydroxide they are suitable to form the desired compounds by subsequent reaction with one of the alpha-hydroxy carboxylic acids of the invention.

If it is desired to retain some of the anions of the starting antimony salt, or the alkoxide radicals of a starting antimony pentaethoxide, for example, this may be done by suitable control of the operating conditions of the processes discussed above. For example, less than stoichiometric quantities of water and nitric acid for complete conversion to the pentahydroxide could be used in the oxidation of antimony trichloride with nitric acid to retain a certain amount of the starting chloride anion attached to the antimony. Even if a slight excess of water and of nitric acid is used, it will be found that some chloride is retained. A larger excess of water and of nitric coupled with more prolonged heating will, however, result in virtually complete removal of the chloride.

Similarly, if it is desired to retain alkoxide radicals when starting with a penta-alkoxide as a starting material, less than a stoichiometric amount of water may be employed in the hydrolysis step. If, for example, it is desired to retain 1.5 ethoxide radicals when starting with antimony pentaethoxide, only 3.5 moles of water can be employed rather than the five which would lead to complete hydrolysis to form the antimony pentahydroxide.

Utility of the invention

The dispersions of the invention may be readily incorporated into a variety of organic polymers, soluble in the polar organic solvents of the invention, such as polyacrylonitrile, copolymers of acrylonitrile with vinyl and vinylidene halides, polyamide, polyester, polyurethane, polyacrylate, polyvinyl chloride and acrylonitrile-butadiene-styrene copolymers particularly halogen-containing polymers or copolymers, and the resulting compositions are highly resistant to combustion. Thus, many fibers, foams and plastics can be effectively flameproofed using the compositions of the invention. The very small particle size of the pentavalent antimony compounds or colloids of the invention make the dispersions or solutions particularly suitable as additives to fibers and films, since the particles do not scatter light, and therefore, the fibers and films are not delustered. Thus, at treatment levels of from 3 to 10% antimony in the fiber, a tartaric acid stabilized dispersion in dimethylformamide imparts a high flame retardancy to polyacrylonitrile modified with vinyl chloride without delustering the fibers. Similarly, completely clear colorless nylon films or fibers containing up to as much as 30% antimony oxide in the form of a 1:1 mole ratio compound with tartaric acid cast or spun from formic acid solutions show improved flame retardance. Employing other solvents of the invention, it is possible to incorporate the flame retardant antimony complexes of the invention in a wide variety of other polymers particularly in the form of films, foams and fibers.

The compositions of the invention posses a unique combination of properties, particularly for applications as flameproofing additives for organic polymers. First, and as previously noted, they are soluble and compatible with a variety of solvents which are commonly used for spinning and film casting of such polymers. This is in contrast to many prior art materials such as the glycol compounds of trivalent antimony, for example, which are not soluble in such solvents. Even the salts of the acidic esters of this invention are sufficiently soluble that they may be incorporated. This is in contrast to compositions such as potassium antimonyl tartrate and similar metal salts of trivalent antimony which are insoluble in the solvents most suited for processing organic polymers.

Because of the fine state of subdivision maintained as a result of the compatibility of the compounds of the invention with the polymers previously listed, the compositions are highly active on the unit weight basis and thus excel over prior art sources of antimony as flameproofing material. For example, it has often been customary in the art to incorporate large particle size antimony oxide, antimony sulfide, and similar insoluble compounds into organic polymers. The large particle size of such prior art materials not only causes delustering and pluggage of spinnerettes and filter packs, but also leads to relatively low efficiency as flame retardants, since generally only the surface atoms in the large particles can participate in the chemical reactions which enhance flame resistance.

Compositions of the invention have an unusual balance of properties with respect to hydrolysis by water. They are sufficiently resistant to avoid premature hydrolysis due to traces of water during processing on the one hand, but can be hydrolyzed or insolubilized on exposure to aqueous solutions. The extent to which the compositions of the invention are susceptible to hydrolysis depends on the particular compound and the conditions. However, the antimony-containing hydrolysis products are in an extremely fine size range. These particles do not scatter light, and thus do not lead to delustering of the fiber. Because particle size of the hydrolysis products is so fine, they also maintain the high efficiency characteristic of a molecular or near molecular state of subdivision. Since the antimony oxide and hydrous oxide resulting from the hydrolysis is quite insoluble in aqueous solution, the compositions of this invention are not extracted from the fiber once incorporated therein, and give very permanent flameproofing treatment, even after repeated exposure to hot water in processing and in normal use conditions.

The amount of antimony to be incorporated into a polymer will vary somewhat with the nature of the polymer and the degree of flame resistance required but will generally range between 0.5% and 20% calculated as $Sb_2O_5$ by weight of the polymer. Loadings below 0.5% are often insufficient to achieve substantial improvement in flame resistance while amounts in excess of 20% are usually not required even with polymers most susceptible to burning.

Generally, polymers containing organic halogens either as copolymers or as an additive such as polyvinyl chloride, tetrabromophthalic anhydride, chlorinated or brominated waxes and terpenes etc. respond most favorably to the antimony compounds of the invention, presumably because of the formation of volatile antimony halides and oxyhalides which interfere with flame propagation by trapping free radicals. For this reason, smaller amounts of antimony compounds are required when used in conjunction with organic halogens and highly flame-resistant polymers can be prepared having only a few percent of the antimony esters of the invention.

The most preferred range is from 1% to about 10% per unit weight of polymer calculated as $Sb_2O_5$ in the composition when organic halogens are present and from about 5% to 19% in the absence of organic halogens.

The following examples further illustrate this invention. All percentages are on a weight basis unless otherwise indicated.

EXAMPLE 1

Two hundred ninety-nine grams of antimony pentachloride (one mole) are dissolved in 1000 g. of dimethylformamide and 50 g. of water are added, along with 150 g. of tartaric acid. The solution is cooled to 40° C. and gaseous anhydrous ammonia is passed in. The precipitated ammonium chloride is removed by filtration, first when the pH reaches 2.2, at which point 59 grams of ammonium chloride are removed, again when the pH reaches 5.5, when an additional 50 g. of ammonium chloride are removed, and for the third time when the pH reaches 6.3, when 56 g. of ammonium chloride are removed.

The resulting solution of a pentavalent antimonyl tartrate compound is shown by chemical analysis to contain 7.7% antimony, 1.01% chloride, and 1.4% water. This is a composition of the case containing a 1:1 mole ratio of tartaric acid to antimony, with about four-tenths of a mole of residual chloride per mole of antimony, as an additional stabilizing anion. This material is mixed with a 30% solution in DMF of a copolymer consisting of vinylidene chloride and 80% polyacrylonitrile in a quantity sufficient to furnish 10% antimony on the weight of the copolymer. A portion of this material is dried to give completely clear, lustrous films of modified polyacrylonitrile with no color and no delustering. These films are self-extinguishing in a 45° angle burning test (Test Method AATCC 33—1962 as described on pages B-139 to B-142 of the AATCC Technical Manual, 1968 edition, volume 44, September 1968 published by the American Association of Textile Chemists and Colorists, Research Triangle Park, N.C.; method modified by maintaining flame impingement until specimen ignites or for a maximum of 30 seconds). Other portions of this composition are spun into fibers using traditional dry-spinning techniques for polyacrylonitrile fibers, involving extrusion under pressure through a small orifice into heated air held at 140° C., which evaporates 70% of the solvent in the composition, followed by pulling the fiber through a 100° C. washing bath while drawing it in excess of three times its original length, simultaneously washing out the remaining dimethylformamide solvent, and then drying further at 140° C. to eliminate residual traces of solvent and water.

Fabrics of various weights and patterns of construction made of these fibers are bright and lustrous. The various fabrics prepared from this fiber are also found to be self-extinguishing in 45° angle burning tests.

EXAMPLE 2

Two hundred seven grams of anhydrous antimony trichloride are mixed with 270 g. of 70% aqueous nitric acid and heated at 80° C. on a steam bath for a period of 20 minutes. Forty-five grams of 37% aqueous formaldehyde solution are added dropwise, at the end of which time the solution is colorless and fumes of nitrogen oxide have ceased to evolve. One hundred thirty-five grams of tartaric acid are added and the resulting clear syrup is dissolved in 1800 cc. of dimethylformamide. An additional one liter of dimethylformamide is added and the product is distilled to a constant boiling point of approximately 50° C. at 8 millimeters mercury pressure. The resulting clear, colorless complex of pentavalent antimony-tartaric acid is analyzed and found to contain 0.51% chloride, 1.18% water, and 5.80% antimony. This represents 0.3 mole of chloride as residual stabilizing agent per mole of antimony.

This is mixed with a polyacrylonitrile-vinylidene chloride copolymer in dimethylformamide as described in Example 1. Equivalent results are obtained with clear, colorless, lustrous films and fibers being prepared with the films, fibers and cloth prepared in this fashion all passing the 45° angle burning test.

EXAMPLE 3

Three 23 gram samples of anhydrous $SbCl_3$ are heated with 50 grams of 70% aqueous $HNO_3$ for 40 minutes at 80° C. Then 3.7 grams of tartaric acid are added to the first sample, followed by 200 mls. of DMF, and water is removed by vacuum distillation. A stable solution is obtained which is clear, and in this case contains only 0.25 mole of tartaric acid per mole of antimony. To a second sample are added 10 drops of 37% aqueous formaldehyde solution. The purpose of this is to destroy residual nitrate. The sample is then mixed with 3.75 grams of tartaric acid and 200 mls. of DMF and distilled until substantially free of $H_2O$. This gives initially a turbid solution which clears up overnight. To a third sample 5 drops of formaldehyde are added, which gives a turbid solution, which again clears up overnight. The latter two examples exemplify the effect of smaller quantities of stabilizing nitrate ion at 0.25:1 tartaric acid to antimony ratios. It is to be noted that although the solutions initially go through a turbid phase when nitrate is removed by reaction with formaldehyde, they clear up on standing. It is believed that this occurs because colloidal antimony hydroxide is first formed when the stabilizing nitrate anion is removed with formaldehyde, and this has a tendency to flocculate. However, as soon as the tartrate complexes are formed, these are adsorbed on the surface of the colloidal antimony hydroxide particles which repeptize to give clear colorless solutions.

EXAMPLE 4

Two hundred twenty-eight grams of anhydrous antimony trichloride are added to 300 g. of 70% aqueous nitric acid and heated on a steam bath for 20 minutes. Thirty-seven percent aqueous formaldehyde solution is added until nitrogen oxide fumes are no longer evolved, and then 150 g. of tartaric acid are dissolved in the mixture. Four hundred seven grams of a syrupy liquid are recovered, which is diluted with 1455 g. of formic acid. Four hundred eight-five grams of a 66 nylon polymer, having a commercial designation of Zytel® nylon resin, a product of E. I. du Pont de Nemours & Co., is heated and stirred until the nylon is dissolved in the formic acid solution of the 1:1 antimony-tartaric acid compound. This polymer solution is dry-spun and forms a completely clear and lustrous nylon fiber which contains approximately 23% antimony in the form of the tartaric acid compound. This is employed as a masterbatch to disperse about 1.5% antimony in the form of the tartaric acid compound in nylon by melt spinning. This improves the flame resistance of nylon substantially. Even better flame resistance is obtained when a halogenated terpene is added to the molten nylon melt to furnish a synergistic source of halogen for interaction with the antimony complex of the invention.

EXAMPLE 5

Two hundred twenty-eight grams of antimony trichloride are placed in a Pyrex evaporating dish and 300 g. of 70% aqueous nitric acid are added and the mixture heated for 20 minutes at 80° C. Seventy-three grams of 37% aqueous formaldehyde are then added until the fumes of nitrogen oxide cease evolving and 150 g. of tartaric acid are then added to the resulting clear, syrupy liquid. Four hundred twenty grams are recovered. This syrup is placed in a large glass dish and evacuated for approximately 20 hours at 25° C. in a vacuum oven. The heat is increased to 100° C. for 21 hours. The essentially anhydrous complex of the invention is analyzed and found to contain 6.4% chloride, 34.08% antimony, 14.2% carbon, 2.2% hydrogen, and essentially no detectable nitrogen. This corresponds very well with the analysis to be anticipated from a composition having a 1:1 mole ratio of tartaric acid to antimony with the remaining three valences of the pentavalent antimony satisfied with approximately one retained chloride and two hydroxides.

The nuclear magnetic resonance (NMR) spectrum of an approximately 10 percent by weight solution of the anhydrous compound prepared above in deuterated dimethylsulfoxide (DMSO-$d_6$) measured at 60M c.p.s. shows a broad singlet at 4.60 delta with a half width of 16 c.p.s. as compared to 4.37 delta for pure tartaric acid in DMSO-$d_6$. This is consistent with the formation of a CHO-Sb bond. However, the NMR spectrum of the compound in DMSO-$d_6$ measured at 220M c.p.s. has a broad multiplet at 4.60 delta with a half width of 48 c.p.s. This result indicates that only one hydroxyl group is involved in the bonding. The infrared (IR) spectrum of a DMSO solution of the compound shows broad carbonyl absorption at 5.82 microns, with a shoulder at 6.04 microns.

The above NMR and IR spectra are consistent with the following structure:

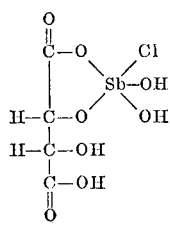

EXAMPLE 6

Two hundred twenty-eight grams of antimony trichloride are placed in an evaporating dish to which is added 300 grams of 70% nitric acid, and this is heated on a steam bath for 20 minutes. Approximately 33 grams of 37% aqueous formaldehyde solution is added, after which 150 grams of tartaric acid is added. This is diluted out with 2000 grams of dimethylformamide. Eighty-one grams of zinc oxide powder are added and allowed to stir until the mixture becomes clear. Analysis shows that the resulting solution contains 4.0% antimony, 2.4% zinc, 0.07% water, and 1.45% chloride. This product is added to a polyacrylonitrile-vinylidene chloride copolymer as in Example 1, cast into films and spun into fibers. It gives clear, lustrous fibers and fabrics which show excellent flame resisting properties, passing the 45° angle flame tests in the form of the film and in the form of the fabrics of various types of construction. The loading is 10% of total metal, that is antimony plus zinc, based on the weight of the polyacrylonitrile-vinylidene chloride copolymer.

EXAMPLE 7

Two hundred twenty-eight grams of antimony trichloride are weighed into a large evaporating dish and 300 g. of aqueous 70% nitric acid are heated on a steam bath at 80° C. for 20 minutes. Fifty-three grams of 37% aqueous formaldehyde solution is added and following the completion of the reaction to destroy the nitrate ion, 150 grams of tartaric acid are added. This is then added to 2 liters of ethylene glycol and excess water removed by distillation to give a clear, stable product, representing a 1:1 compound of tartaric acid with pentavalent antimony dissolved in ethylene glycol.

EXAMPLE 8

Two hundred twenty-eight grams of antimony trichloride are placed in a large evaporating dish and 300 grams of 70% aqueous solution of nitric acid are added and heated on a steam bath for 20 minutes at 80° C. Thirty-seven percent formaldehyde is added until the nitrogen oxide fumes have disappeared and 150 grams of tartaric acid are then added. Three hundred sixty grams of a clear, syrupy product, representing a 1:1 complex of tartaric acid to pentavalent antimony are recovered. Thirty-six gram samples of this are added to 250 gram portions of the following solvents: formamide, dimethylacetamide, tetramethylurea, dimethylsulfoxide, glycerine, ethylene glycol, diethylene glycol and monomethylformamide. In all cases, clear solutions of the complex in these solvent systems are obtained.

EXAMPLE 9

Two hundred twenty-eight grams of anhydrous antimony trichloride are placed in a large evaporating dish and 300 grams of 70% aqueous nitric acid are added. The mixture is heated on a steam bath at 80° C. for 20 minutes. Approximately 55 grams of 37% aqueous formaldehyde solution are now added to destroy the excess nitrate ions. Seventy-five grams of tartaric acid are added, and the resulting clear syrup, which weighs 420 grams, is diluted with 2 liters of dimethylformamide. This clear solution is placed in a 5 liter distilling flask, and 2 more liters of DMF are added and distilled under vacuum at 10 microns pressure until the volume is reduced to approximately 2 liters. At this point the temperature is 55° C. One thousand eight hundred seventy-six grams are recovered, which analysis shows contain 6.1% antimony, 0.42% chloride, and 0.16% water. This represents a compound having 0.5 mole of tartaric acid per mole of antimony.

EXAMPLE 10

Two hundred twenty-eight grams of antimony trichloride are placed in a large evaporating dish and 300 grams of aqueous 70% nitric acid are added and the mixture heated on a steam bath at 80° C. for 20 minutes. Approximately 55 grams of formaldehyde solution are added to destroy the excess nitrate ion, and this is followed by the addition of 37.5 grams of tartaric acid. The resulting clear solution is diluted with 2000 mls. of dimethylformamide, placed in a 5 liter distillation flask, and an additional 2000 mls. of DMF added and distilled under vacuum of 10 microns until the volume is reduced to approximately 2000 mls.

This material, while clear, has a definite blue opalescence characteristic of colloidal particles. Electron micrograph examination shows colloidal particles of approximately 10 millimicrons in diameter. This represents a stabilized colloid in which the tartaric acid to antimony ratio is 0.25. Chemical analysis shows that the percent antimony is 5.6%, chloride 1.3%, and water, 0.29%.

EXAMPLE 11

A mixture of 1.34 g. d,l-malic acid ($10 \times 10^{-3}$ moles), 1.7 g. antimony pentaethoxide ($5.0 \times 10^{-3}$ moles) and 10 cc. DMSO-$d_6$ (containing 0.05% $H_2O$ as determined by Karl Fisher titration) is placed in a 20 cc. vial. To this is added 0.1 g. water. After several minutes the solution is clear and colorless. Examination of the solution by NMR spectroscopy shows a multiplet at 4.50 delta as compared to 4.35 delta for pure maleic acid in DMSO-$d_6$. These results are indicative of the formation of a CH—O—Sb bond. Repetition of the same experiment in DMSO and examination of the IR spectrum of the solution shows a carbonyl band at 5.82 microns with a shoulder at 5.87 microns. This result indicates that one carboxylic group is involved in the bonding. The product is a compound containing two moles of malic acid per mole of pentavalent antimony, and having the following structure:

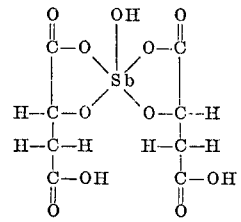

EXAMPLE 12

A mixture of 0.76 g. glycolic acid ($10 \times 10^{-3}$ moles), 1.7 g. antimony pentaethoxide ($5.0 \times 10^{-3}$ moles) and 10 cc. DMF (containing 0.05% $H_2O$ as determined by Karl Fisher titration) is placed in a 20 cc. vial. To this is added 0.1 g. water. After several minutes the solution is clear and colorless. Examination of the solution by NMR spectroscopy shows a triplet-like structure centered at 4.17 delta as compared to 4.08 delta (sharp singlet) for pure glycolic acid in DMF. This result is consistent with the formation of a 5-membered ring. The product is a compound containing two moles of glycolic acid per mole of pentavalent antimony, and having the following structure:

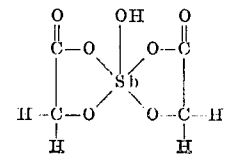

EXAMPLE 13

Example 12 is repeated using 1.50 g. d-tartaric acid ($10 \times 10^{-3}$ moles) instead of 0.76 g. glycolic acid. A clear, colorless solution of a compound containing two moles of tartaric acid per mole of pentavalent antimony is obtained. The NMR spectra is consistent with the following structure:

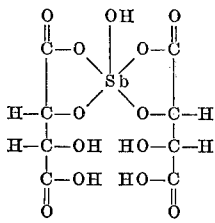

EXAMPLE 14

Two parts of a solution of a pentavalent antimonyl tartrate compound in dimethylformamide, prepared as in Example 1 and containing 7.7% antimony by analysis is added to 1.5 parts of polyvinyl chloride dissolved in ten parts of hot dimethylformamide. The clear solution is poured onto a Pyrex plate and dried in a circulating oven for 30 minutes at 120° C. to give a clear, lustrous film. The film passes the 45° angle burning test. A film similarly prepared from a dispersion of 0.15 part of a commercial antimony oxide powder (B&A reagent grade), in a solution of 1.5 parts of polyvinyl chloride dissolved in 10 parts of dimethylformamide is delustered, and is inferior in the burning test to the film prepared from the antimony tartrate compound, although the antimony content of the film is similar.

Two parts of a solution of a pentavalent antimonyl tartrate compound in dimethylformamide solution prepared as described above, is added to 1.5 parts of methyl methacrylate and 0.2 part of powdered Chlorowax® 70 (a chlorinated hydrocarbon wax supplied by the Diamond Chemical Company) dissolved in 10 parts of dimethylformamide. A clear, lustrous film, prepared as above, passes the 45° angle burning test. A film containing a similar amount of antimony prepared from a dispersion of a commercial antimony oxide powder as described above is delustered, and shows inferior flame resistance in the burning test to the film containing the pentavalent antimonyl tartrate compound, although the antimony content of the film is similar.

Two parts of a solution of a pentavalent antimonyl tartrate compound in dimethylformamide solution prepared as described above is added to 1.5 parts of a polyurethane (Helastic® LS-13160, supplied by the Wilmington Chemical Corp.) and 0.2 part of powdered Chlorowax® 70 dissolved in 10 parts of dimethylformamide. A clear, lustrous film prepared as described above is found to be self-extinguishing in the 45° angle burning test.

What is claimed is:

1. A solution comprising an antimony compound selected from the group consisting of an ester having the formula

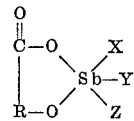

wherein

is a divalent radical of an alpha-hydroxy carboxylic acid of 2 to 6 carbon atoms, X, Y and Z independently are anions selected from the group consisting of hydroxide, formate, alkoxide of 1 to 4 carbon atoms, chloride, bromide, acetate, and nitrate, and X and Y together are

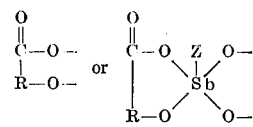

and zinc and stannous salts of said ester, and a polar organic solvent selected from the group consisting of formamide, monomethylformamide, dimethylformamide, acetamide, methylacetamide, dimethylacetamide, dimethylsulfoxide, ethylene glycol, glycerol, formic acid, tetramethylurea, methanol and ethanol, the mol ratio of combined acid to antimony in the solution being in the range of 1:1 to 2:1.

2. The solution of claim 1 wherein the polar organic solvent is selected from the group consisting of dimethylformamide, dimethylsulfoxide, formamide and formic acid.

3. The solution of claim 1 wherein

is selected from the group consisting of

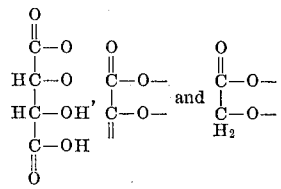

and

4. The solution of claim 1 wherein X, Y and Z are hydroxide.

5. The solution of claim 3 wherein X, Y and Z are hydroxide.

6. The solution of claim 1 wherein the antimony compound is the zinc salt of said ester.

7. The solution of claim 1 wherein the antimony compound is the stannous salt of said ester.

8. An colloidal sol comprising colloidal particles of hydrous antimony pentoxide having diameters up to 100 angstrom units, stabilized with an alpha-hydroxy carboxylic acid of from 2 to 6 carbon atoms, the ratio of alpha-hydroxy carboxylic acid to antimony being from 0.1 to 1 to less than 1:1, and a polar organic solvent selected from the group consisting of formamide, monomethylformamide, dimethylformamide, acetamide, methylacetamide, dimethylacetamide, dimethylsulfoxide, formic acid, tetramethylurea, methanol and ethanol.

9. The sol of claim 8 wherein the polar organic solvent is selected from the group consisting of dimethylformamide, dimethylsulfoxide, formamide and formic acid.

10. The sol of claim 8 wherein the alpha-hydroxy carboxylic acid is selected from the group consisting of oxalic acid, hydroxyacetic acid and tartaric acid.

11. The sol of claim 8 wherein the ratio of alpha hydroxy acid to antimony is from 0.25:1 to less than 1:1.

12. A process for preparing a dispersion of hydrous antimony pentoxide particles having diameters up to 100 A. units stabilized with an α-hydroxy carboxylic acid of up to 6 carbon atoms, comprising contacting antimony trichloride with nitric acid in water at a temperature of below 100° C. to form an oxidation mixture, adding formaldehyde to the oxidation mixture to form a dispersion of pentavalent antimony hydroxide, adding from 0.1 to less than 1 mole of α-hydroxy carboxylic acid of from 2 to 6 carbon atoms per mole of antimony to stabilize the pentavalent antimony hydroxide and adding a polar organic solvent selected from the group consisting of formamide, monomethylformamide, dimethylformamide, acetamide, methylacetamide, dimethylacetamide, dimethylsulfoxide, formic acid, tetramethylurea, methanol and ethanol, to the stabilized dispersion of pentavalent antimony hydroxide.

13. The process of claim 12 wherein the oxidation mixture is formed at a temperature of from 60° to 80° C.

14. A process for preparing a solution of a pentavalent antimony ester of an α-hydroxy carboxylic acid of from 2 to 6 carbon atoms comprising contacting antimony trichloride with nitric acid in water at a temperature below 100° C. to form an oxidation mixture, adding formaldehyde to the oxidation mixture to form a dispersion of pentavalent antimony hydroxide, adding from 1 to 2 moles of an α-hydroxy carboxylic acid having from 2 to 6 carbon atoms per mole of antimony to form a solution of a pentavalent antimony ester, adding a polar organic solvent selected from the group consisting of formamide, monomethylformamide, dimethylformamide, acetamide, methylacetamide, dimethylacetamide, dimethylsulfoxide, formic acid, tetramethyl urea, methanol and ethanol, and removing water from the solution to form a solution of a pentavalent antimony ester in a polar organic solvent.

15. The process of claim 14 wherein the oxidation mixture is formed at a temperature of from 60° to 80° C.

16. The solution of claim 1 also containing a polymer selected from the group consisting of polyacrylonitrile, copolymers of acrylonitrile with vinyl and vinylidene halide, polyamide, polyester, polyurethane, polyacrylate, polyvinyl chloride and acrylonitrile-butadiene-styrene copolymer, the amount of polymer being such as to provide 0.5–20 weight percent of the antimony compound, calculated as $Sb_2O_5$, based on polymer.

17. The dispersion of claim 8 also containing a polymer selected from the group consisting of polyacrylonitrile, copolymers of acrylonitrile with vinyl and vinylidene halide, polyamide, polyester, polyurethane, polyacrylate, polyvinyl chloride and acrylonitrile-butadiene-styrene copolymers, the amount of polymer being such as to provide 0.5–20 weight percent of the hydrous antimony pentoxide, calculated as $Sb_2O_5$, based on polymer.

18. A method of making a flame-resistant film which comprises casting the solution of claim 16 and vaporizing the solvent.

19. A method of making a flame-resistant film which comprises casting the dispersion of claim 17 and vaporizing the solvent.

20. A method of making a flame-resistant fiber which comprises dry-spinning the solution of claim 16.

21. A method of making a flame-resistant fiber which comprises dry-spinning the dispersion of claim 17.

References Cited

UNITED STATES PATENTS

| | | | |
|---|---|---|---|
| 3,306,921 | 2/1967 | Axon et al. | 260—446 |
| 2,281,784 | 5/1942 | Mohr | 424—296 X |
| 2,547,671 | 4/1951 | Sostmann et al. | 106—15 FP X |

MORRIS LIEBMAN, Primary Examiner

S. M. PERSON, Assistant Examiner

U.S. Cl. X.R.

260—31.2 R, N, MR, XA, 32.6 R, A, N, 33.4 R, WR, 446 DIG 24; 105—15 FP

PO-1050
(5/69)

UNITED STATES PATENT OFFICE
CERTIFICATE OF CORRECTION

Patent No. 3,657,179      Dated April 18, 1972

Inventor(s) Paul C. Yates

It is certified that error appears in the above-identified patent and that said Letters Patent are hereby corrected as shown below:

Column 14, line 32, in the second formula of Claim 3, O was omitted under the last double bond in the third column, and the formula should read as follows:

is selected from the group consisting of

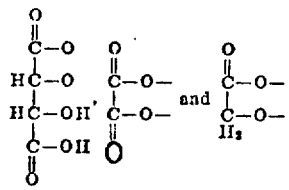

Signed and sealed this 6th day of March 1973.

(SEAL)
Attest:

EDWARD M. FLETCHER, JR.       ROBERT GOTTSCHALK
Attesting Officer      Commissioner of Patents